May 21, 1940.  W. J. MEYER ET AL  2,201,737
CAR ROOF WITH MOVABLE SECTIONS
Filed Jan. 27, 1939  11 Sheets-Sheet 1
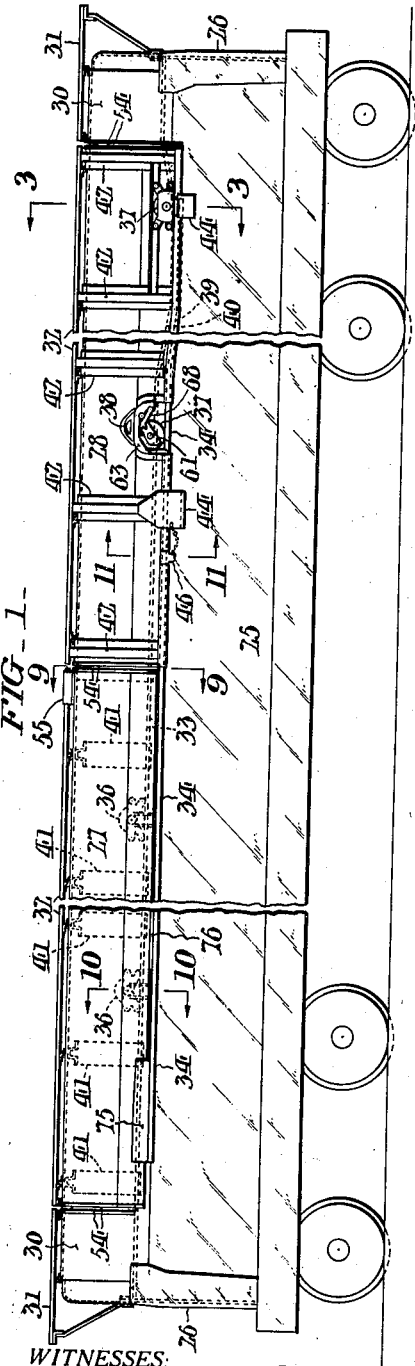
WITNESSES:
INVENTORS:
Wendel J. Meyer &
Thomas W. Demarest,
BY
ATTORNEYS.

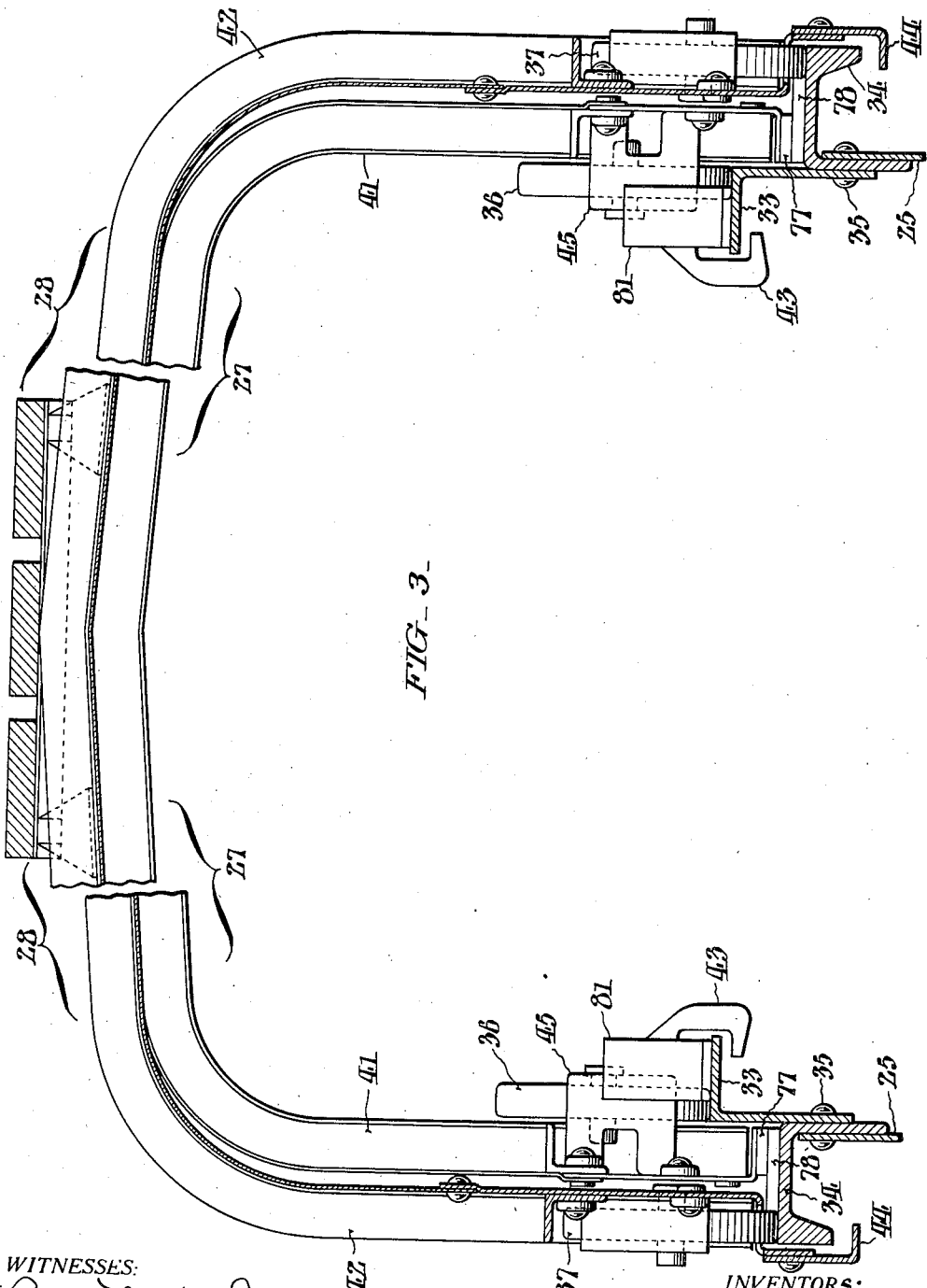

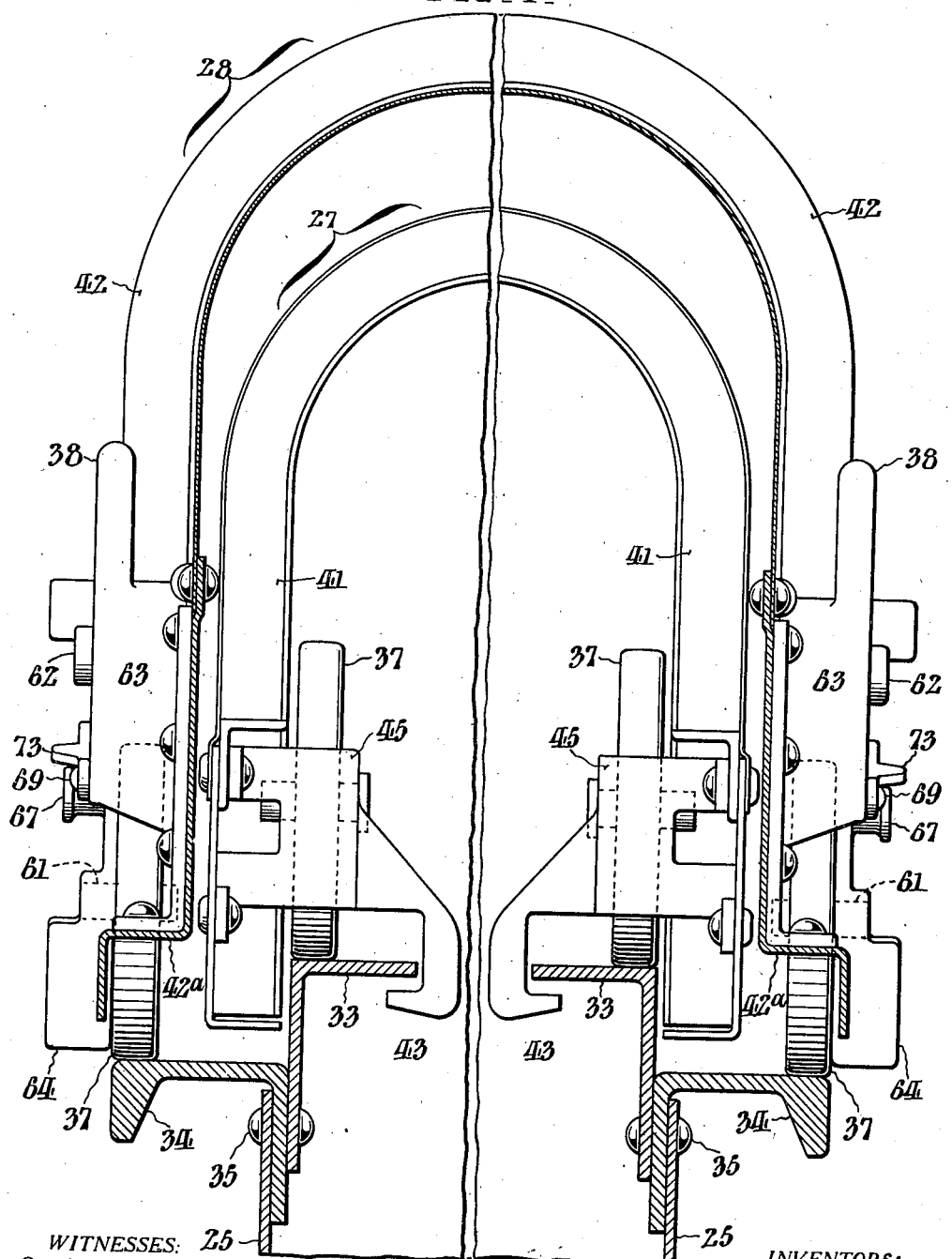

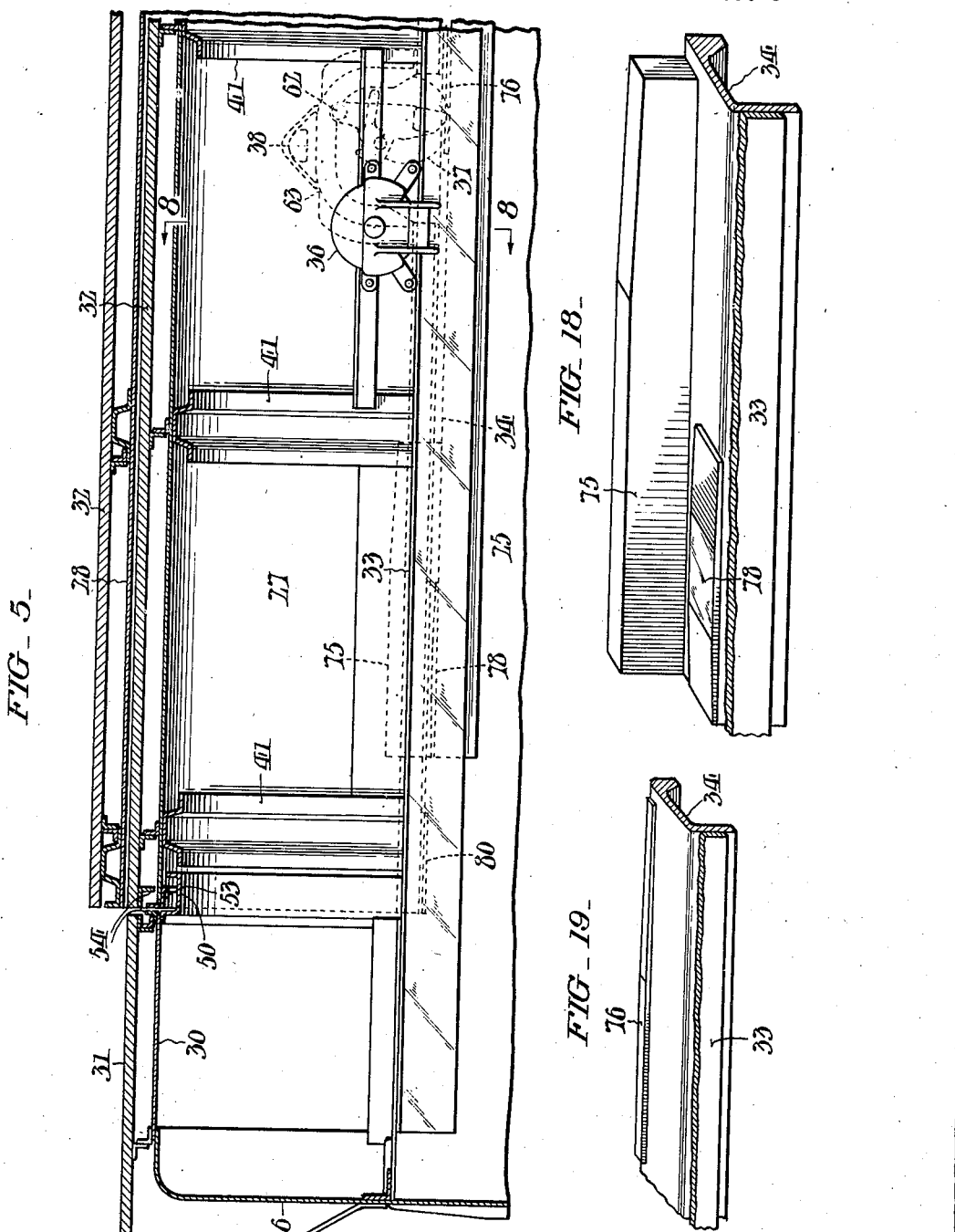

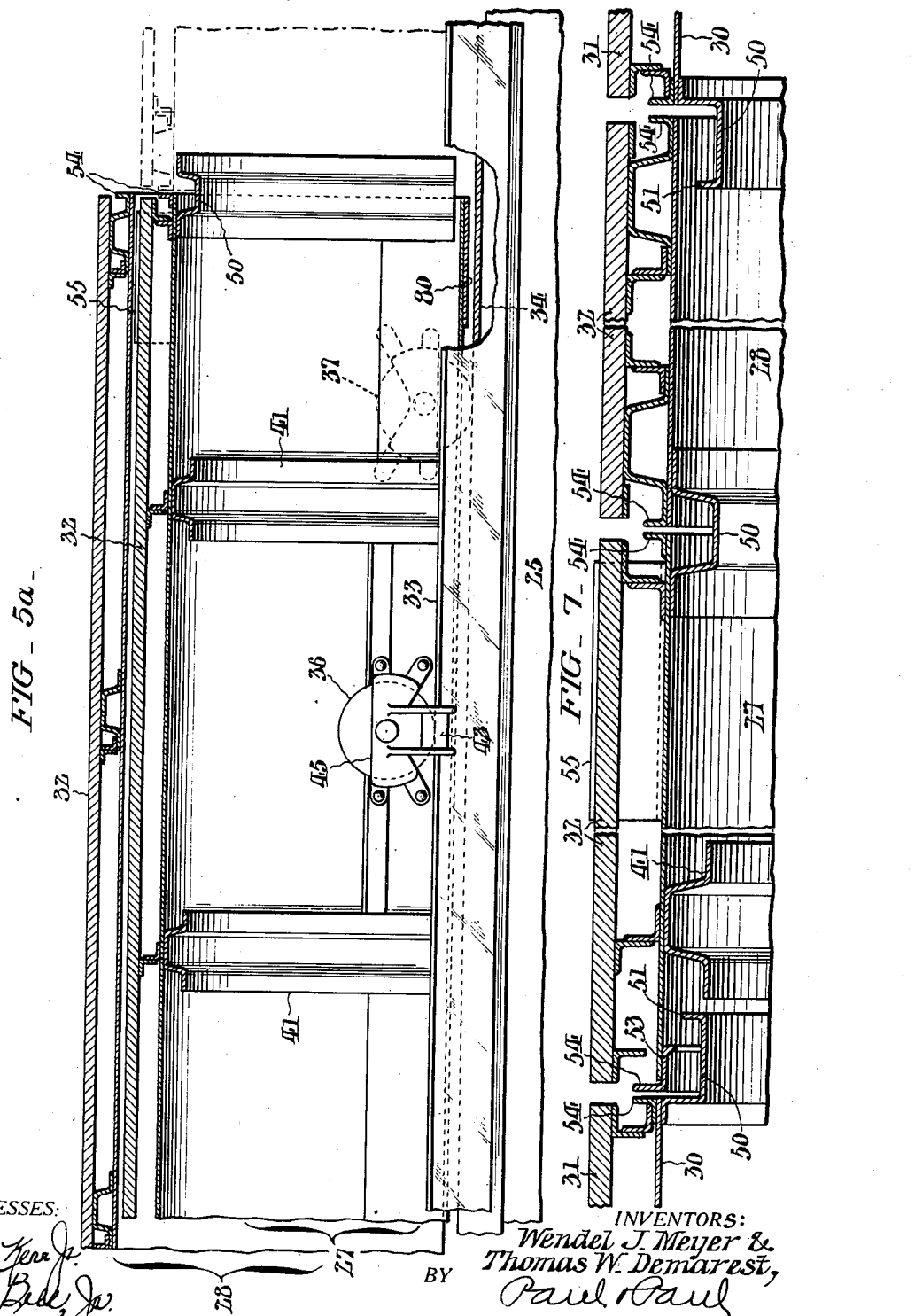

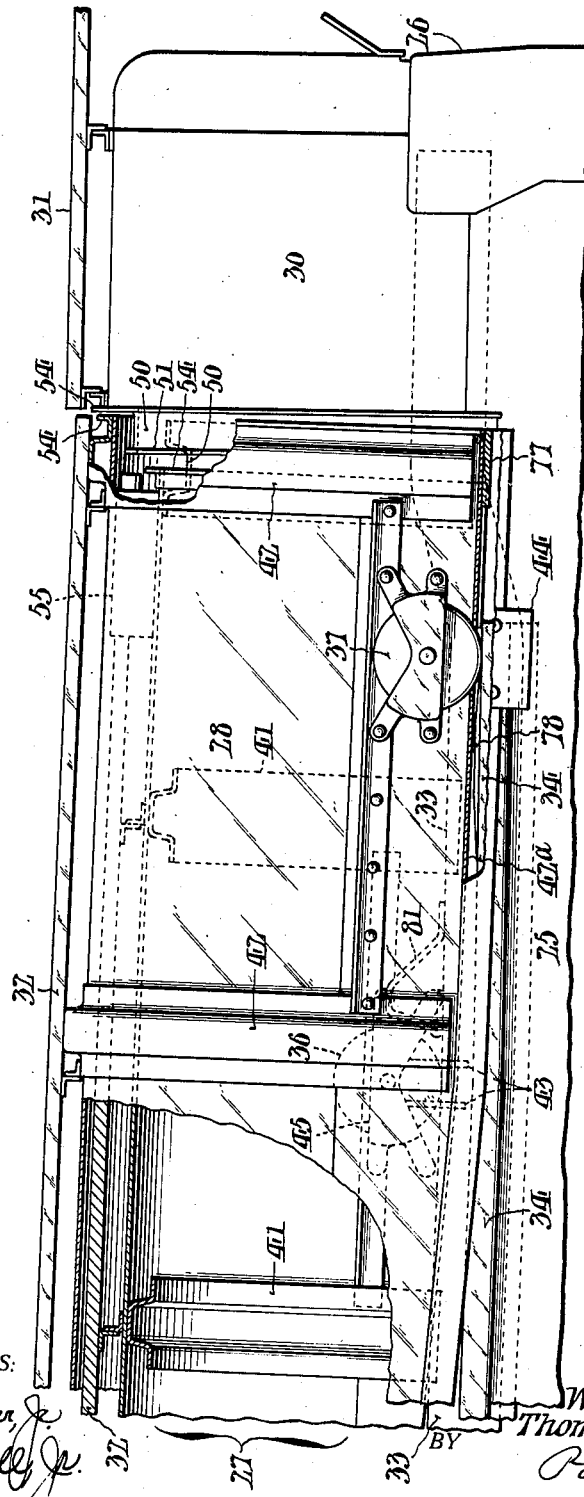

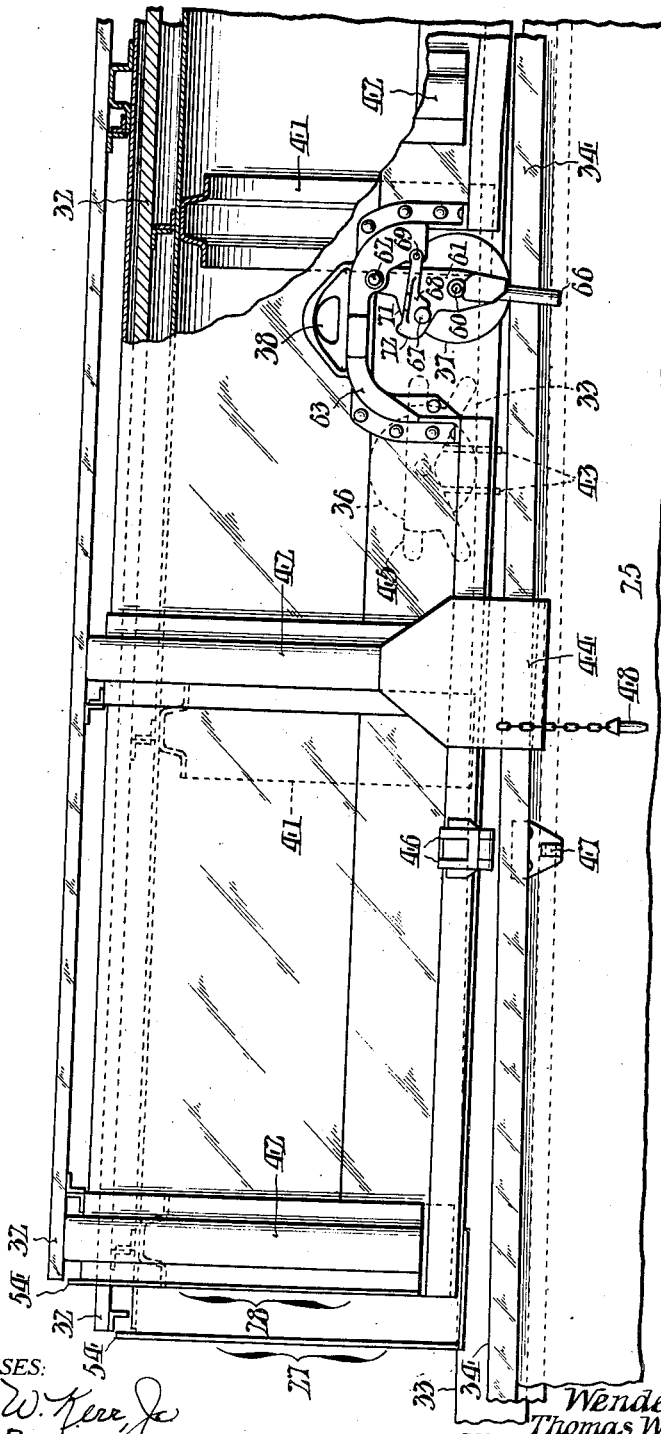

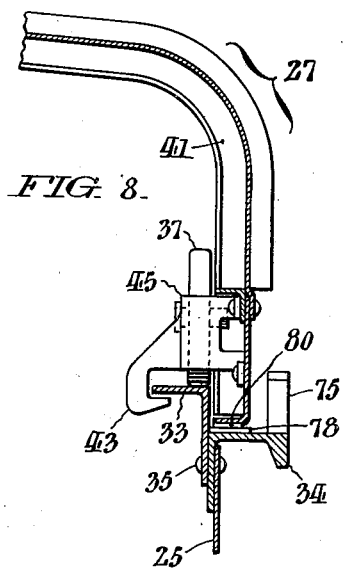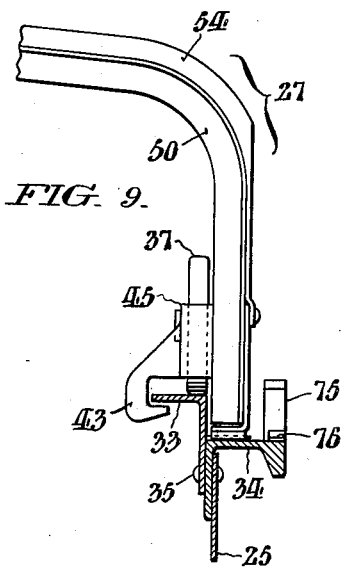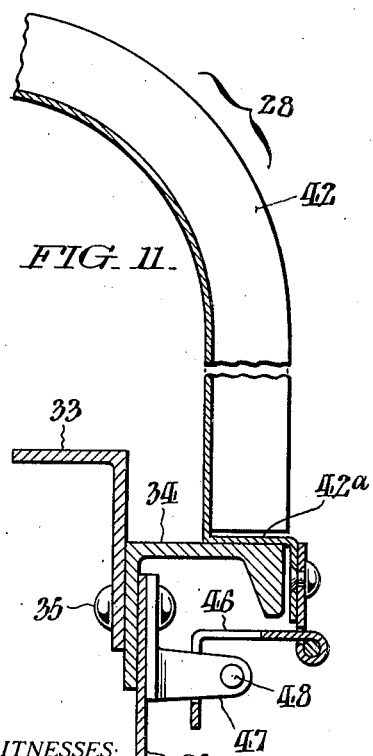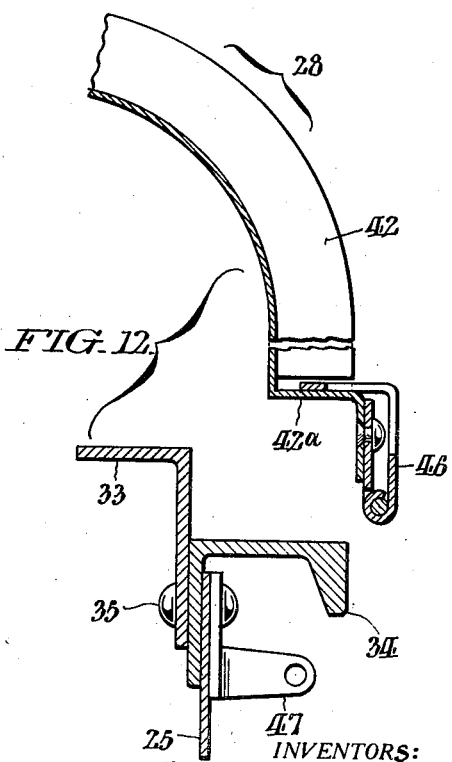

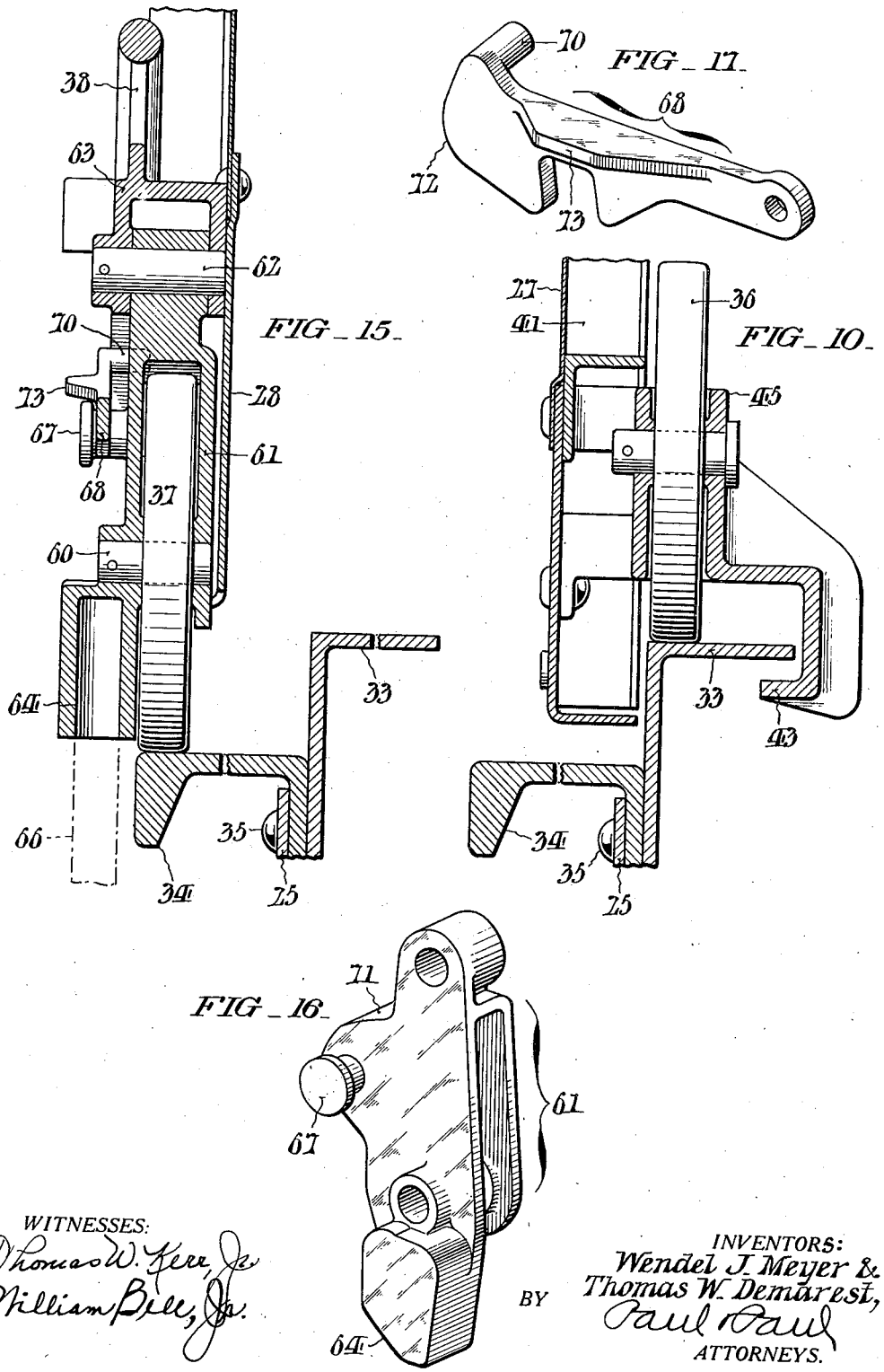

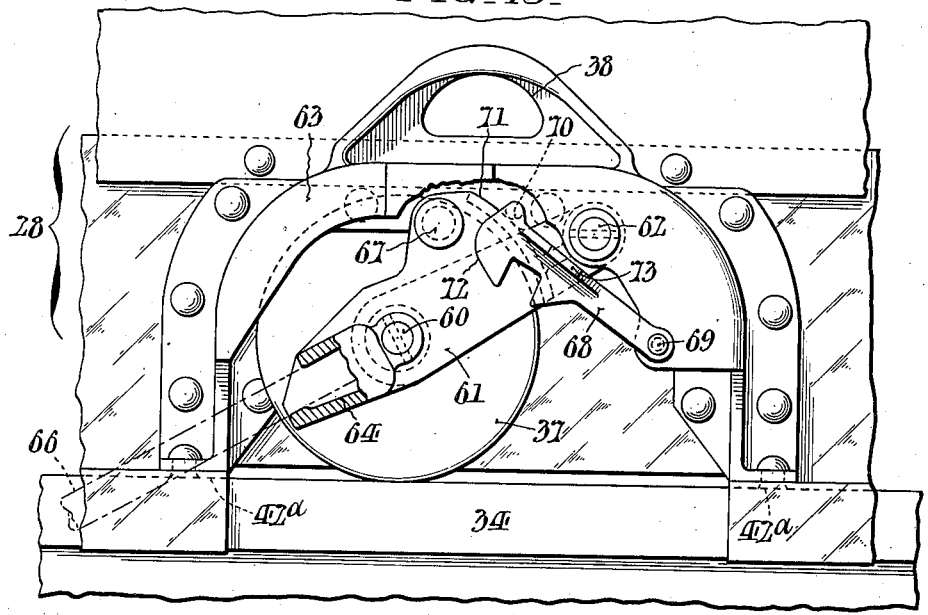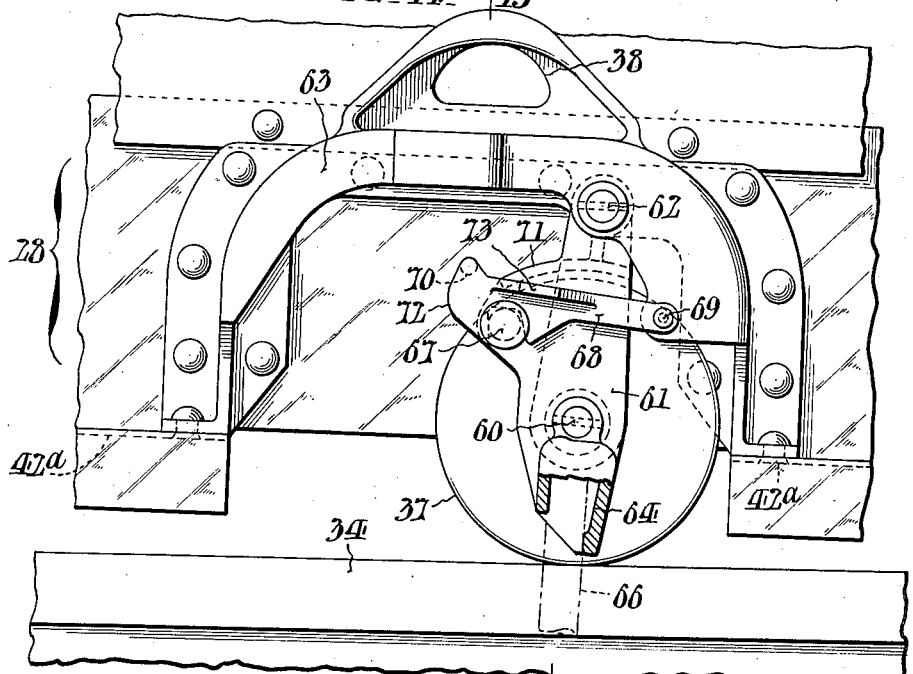

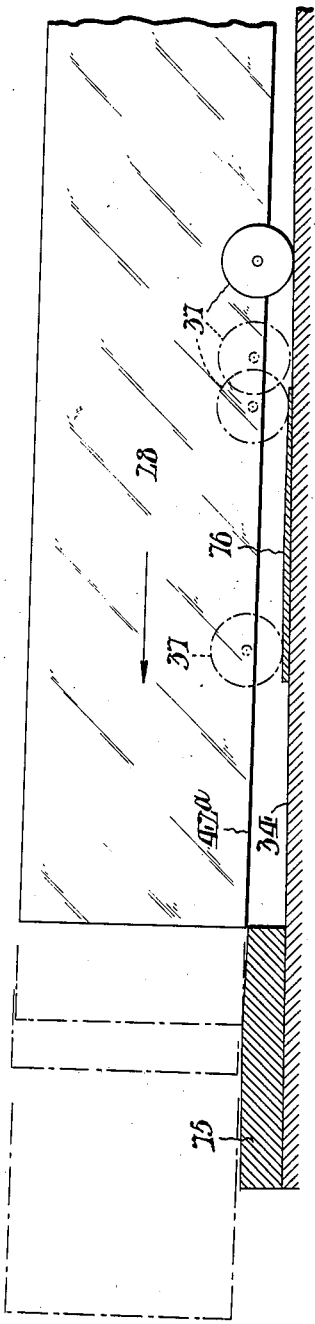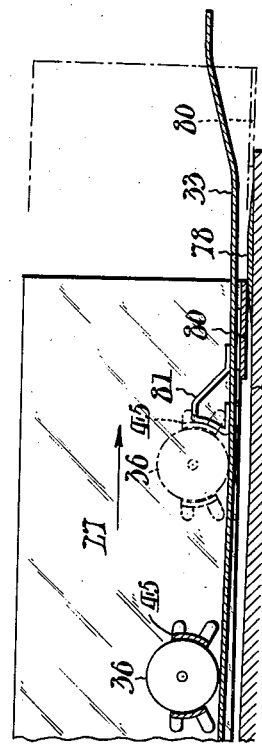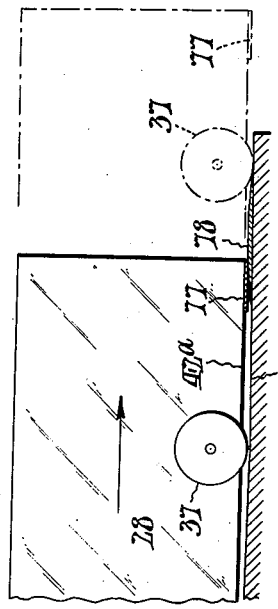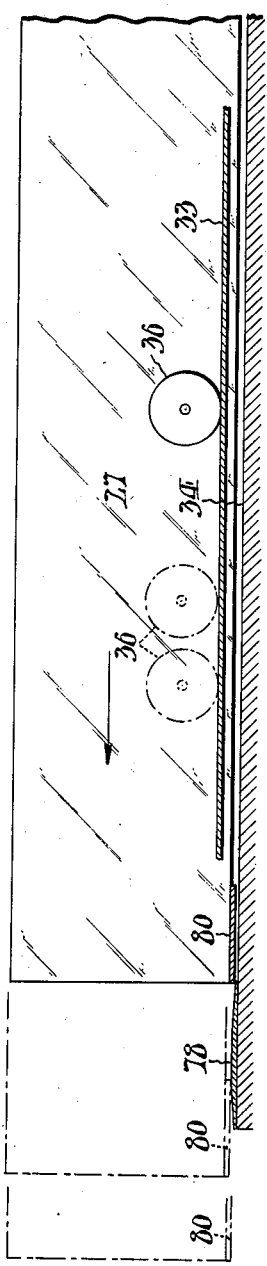

Patented May 21, 1940

2,201,737

UNITED STATES PATENT OFFICE 2,201,737

CAR ROOF WITH MOVABLE SECTIONS

Wendel J. Meyer, Philadelphia, Pa., and Thomas W. Demarest, Onley, Va., assignors to The Pennsylvania Railroad Company, Philadelphia, Pa., a corporation of Pennsylvania Application January 27, 1939, Serial No. 253,030

19 Claims. (Cl. 105—377)

This invention relates to freight-car roofs and the like, the aim being to provide a roof of movable sections that can be conveniently shifted to afford satisfactory openings for loading and unloading from above. Such a roof is particularly desirable on gondola cars used for articles or commodities requiring protection from the weather or from theft—such as various steel-mill products and bulk commodities—and we have here illustrated and explained the invention in connection with a gondola car. However, such a roof is also applicable to any other type of open top car; or to roofed-over types of cars, such as box cars, by substitution of our roof construction for a permanently built-on roof, or for a portion of such a permanent roof. For box cars, substantially the same construction of movable roof sections is applicable as for gondola cars, though permanent cross-ties may be desirable for holding the car sides in line.

Constructed as hereinafter explained, our roof of movable sections affords the important advantage that the roof can be opened and closed manually, without the use of a crane, though when available, a crane can be used to facilitate and expedite the shifting of the roof sections. The roof sections can remain on the car when the roof is open, as well as during the opening movement. The clear width of the roof opening may be practically equal to the inside width of the car, and its longitudinal extent may be substantially equal to about half the length of the car, even without subdividing the movable portion of the roof into more than a couple of sections. Furthermore, a couple of roof sections allow of uncovering either end of the car, as desired, by shifting one of the roof sections lengthwise into superposed or telescoping relation with the other roof section, or by shifting the thus telescoped roof sections from one end of the car to the other. When closed, the roof sections may lie in substantially the same horizontal plane.

The use of our roof involves no material increase in the height of the car sides above the usual loading platforms (at freight stations and terminals) when the roof is opened. The application of the roof to existing cars requires a minimum of change in the car structure, consisting in the case of gondola cars in minor changes at the sides and ends of the cars.

Other features and advantages of the invention will appear from the following description of a species or form of embodiment, and from the drawings. All of the features and combinations shown or described are of our invention, so far as novel over the prior art.

In the drawings, Fig. 1 is a side elevation of a gondola car with a telescoping roof embodying the present invention, portions of the car and roof being broken out and removed to shorten the figure; and Fig. 2 is a similar view showing a section of the roof over the right-hand end of the car tilted or lifted at one end for telescoping with the corresponding left-hand roof section.

Fig. 3 shows a transverse section through the car roof, taken as indicated by the line and arrows 3—3 in Fig. 1, portions of the roof being broken out and removed to bring the view within the limits of the paper; and Fig. 4 is a similar view taken as indicated by the line and arrows 4—4 in Fig. 2.

Figs. 5 and 5a are fragmentary vertical longitudinal sectional views of one end of the car body, showing the right-hand movable roof section of Fig. 1 completely telescoped over the left-hand movable roof section; and Figs. 6 and 6a are similar views showing the left-hand roof section of Fig. 1 telescoped under the right-hand roof section.

Fig. 7 is a fragmentary vertical longitudinal view of the upper portion of the roof structure of Fig. 1, illustrating the joints between the various movable and stationary roof sections.

Fig. 8 is a fragmentary transverse sectional view, taken as indicated by the line and arrows 8—8 in Fig. 5, showing the relation of the inner movable roof section to the car side, as well as one of the supporting rollers for said roof section, the hold-down means for preventing unauthorized or accidental lifting of such roof section, and friction means for retarding the longitudinal movement of the roof section; Fig. 9 is a similar view taken as indicated by the line and arrows 9—9 in Fig. 1; and Fig. 10 is a view similar to Figs. 8 and 9, taken at the other side of the car as indicated by the line and arrows 10—10 in Fig. 1, showing a cross section through the housing and mounting structure for one of the supporting rollers of the inner roof section.

Fig. 11 is a fragmentary transverse sectional view, taken as indicated by the line and arrows 11—11 in Fig. 1, illustrating the relation of the outer roof section to the car body, and also showing how it is locked to the car body; and Fig. 12 is a similar view showing the outer roof section unlocked and lifted or tilted as in Fig. 2.

Fig. 13 is a side view, on a larger scale than Fig. 1, illustrating one of the supporting roller devices for lifting the outer roof section, certain parts being partly broken away or in section; Fig. 14 is a similar view showing the roller shifted and locked in position for holding the outer roof section lifted or tilted for telescoping over the inner roof section; Fig. 15 shows a vertical transverse section through the roller and associated parts, taken as indicated by the line and arrows 15—15 in Fig. 14; Fig. 16 is a perspective view of a movable part of the roller mounting in Figs. 13, 14, and 15; and Fig. 17 is a perspective view of a latch for holding the roller in position for maintaining the roof section lifted as shown in Fig. 14.

Figs. 18 and 19 are perspective views of friction devices for controlling and arresting the opening movement of the outer roof section; Fig. 20 is a diagrammatic view illustrating the roof-arresting action of these devices at the end of the opening movement; Fig. 21 is a perspective view of one of the supporting track rails for the longitudinal movement of the outer roof section, with a friction device for controlling its closing movement; and Fig. 22 is a diagrammatic view similar to Fig. 20, illustrating the action of this device to arrest the closing movement.

Figs. 23 and 24 are diagrammatic views similar to Figs. 20 and 22, illustrating friction means similar to that of Fig. 22, and their action in arresting the opening and closing movements of the inner roof section.

As shown in Figs. 1 and 2, the gondola car has the usual underframe and floor construction, with side walls 25, ends 26, 26 projecting above the side walls to the desired height of the roof, and movable sections 27, 28 covering the space between the upstanding end structures 26, 26. The gondola car illustrated is of a standard type having drop end gates; but in the drawings these are shown as replaced with fixed end walls to which (as well as to the sides 25) are attached the end structures 26, 26, which include short stationary roof sections 30. The stationary end structures 26, 26 and their roofs 30, 30 may carry the usual transverse running boards (not shown), as well as short sections 31 of the longitudinal running boards, while the movable roof sections 27, 28 carry longer intermediate sections 32 of the longitudinal running boards.

As shown in Figs. 1, 2, and 3, there are inner and outer longitudinal trackways 33, 34 along the car sides between the fixed end sections 30, 30, formed by top side angles riveted to the car sides at 35. The roof section 27, distinguished as the inner section, is supported in its travel by four rollers or wheels 36 which travel on the horizontal flanges of the inward extending angles 33, while the roof section 28, distinguished as the outer section, is supported in its travel by four rollers or wheels 37 which travel on the horizontal flanges of the outward extending (bulb) angles 34. As shown in Figs. 3 and 4, the lower margins of both roof sections 27, 28 are of heavier gauge sheet metal than the rest of the plating of these sections, to afford extra strength and stiffness for taking the stresses due to the mountings of the rollers 36, 37, which are attached to them. Ordinarily, when the roof sections 27, 28 are closed, they abut endwise, in substantially the same plane at the flat top of the roof, as shown in Figs. 1 and 3, and the abutting mid-end of the outer section 28 rests directly on the outer trackway 34; but when the sections are to be shifted longitudinally into overlapping or telescoping relation, the outer roof section 28 is lifted at its abutting mid-end, as shown in Fig. 2, to enable it to move over the inner section 27 and its running board. The lifting of the roof section 28 may either be done by means of an overhead crane acting through slings suitably attached to said roof section, as by means of eyes 38 on this roof section, or may be initiated by means coacting with the rollers 37 adjacent the abutting mid-end of this roof section 28, as explained hereinafter. In other words, lifting means independent of any crane are operatively interposed between the outer roof section 28 and its trackways 34, 34, to lift it and allow it to move while both the roof sections 27 and 28 are supported by their trackways 33, 34.

As shown in Figs. 2 and 4, the movable roof section 28 is supported in elevated position by the rollers 37, which have been shifted to a lower position (relative to the roof section 28) than in Fig. 1, to hold the abutting mid-end of the latter raised above that of the section 27. Accordingly, the roof section 28 slopes or tilts upward somewhat toward the left in Fig. 2. As the outer roof section 28 travels to the left over the inner roof section 27, from its position in Fig. 2 to that in Figs. 5 and 5a, the outboard end of said roof section 28 (adjacent the corresponding fixed roof end 30 in Fig. 2) is also lifted, by a ramp 39 in the outer trackway 34, so that when fully shifted to the left over the section 27, the section 28 lies substantially horizontal, as shown in Figs. 5 and 5a. This leaves almost the entire right-hand half of the car open and unobstructed for loading, unloading, inspection, or any other purpose.

If instead of opening the right-hand half of the car it is desired to open the left-hand half, this may be done by shifting the inner roof section 27 to the right along its trackway 33, after raising the outer roof section 28 to its slightly tilted position as shown in Fig. 2. As the roof section 27 moves under the section 28 toward the right-hand end of section 28, its mid-end is lowered by a ramp 40 in the trackway 33 (substantially coincident with the ramp 39 in the trackway 34), so that at the end of the movement the section 27 lies under the section 28, in a slightly tilted position parallel with said section 28, as shown in Figs. 6 and 6a. If after one end of the car body has been uncovered by telescoping the two sections 27, 28 over its other end, as above described, it is desired to uncover the other end of the car, this may be done by shifting the two sections 27, 28 in superposition along their trackways 33, 34, whose ramps 39, 40 will concurrently raise or lower the superposed right-hand ends of the sections 27, 28 as their right-hand rollers 36, 37 traverse the ramps.

To minimize the extent to which one or both the roof sections 27, 28 must be raised or lowered in order to permit the sections to be telescoped, the inner section 27 is preferably constructed with inside transverse reinforcing members or carlines 41 for its sheet metal plating, and the outer roof section 28 with outside transverse reinforcing members or carlines 42. As shown in Figs. 1, 2, 3, 4, 5, 5a, 6, 6a, and 7, the carlines 41, 42 are of a flanged channel cross section, the inside carlines 41 having the channel bottoms attached to the inner surfaces of the plating, while the outside carlines 42 have their flanges attached to the plating. When the roof sections are closed as shown in Figs. 1, 6, 7, 8, and 9, the lower margin of the roof plating of the inner section 27 overlaps outside the upper margin of the car side walls 25, formed by the upright flange of the trackway angle 33, its bottom edge being preferably bent inward to lie close to said angle 33 and exclude the weather, as shown in Figs. 3, 4, 8, and 9. The lower margin of the plating of the outer section 28 overlaps outside the outer trackway 34, being bent or flanged outward and downward at 42a for this purpose, as shown in Fig. 11.

To prevent unauthorized total removal of the roof sections 27, 28 by a crane, or accidentally, metal hook-brackets 43, 44 are attached to the sections 27, 28, to hook under the horizontal trackway flanges 33, 34, as shown in Figs. 1, 2, 3, 4, 8, 9, and 10. The hooks 43 on the inner roof section 27 form part of the mounting brackets 45 for its rollers 36, as shown in Figs. 3, 4, and 10. The hooks 44 on the outer roof section 28 adjacent its lifting rollers 37 extend downward sufficiently below the edge of the trackway flange 34 to allow the necessary lifting of the mid-end of the section 28 as shown in Figs. 2 and 6a; but to prevent unauthorized lifting of the mid-end of the section 28 and thus render impossible the longitudinal movement of either roof section 27, 28, by virtue of their endwise abutting relation when closed as shown in Fig. 1, fastening means for holding down this end of this roof section may be provided. As shown in Figs. 1, 2, 6a, 11, and 12, there is a hinged and apertured hasp 46 which can be swung under each outer trackway flange 34 into engagement around a lug 47 projecting outward from the car side 25, and locked in this position by a pin 48 that may be inserted through a hole in the outer end of said lug, and secured therein in any suitable manner.

As shown in Figs. 5, 6, and 7, provision may be made for weather-proofing the joints between the abutting ends of the fixed and movable roof sections 30 and 27 or 28 by providing one of the sections at each of said joints with an internal flange 50 extending inside the other of said sections, and preferably having an outturned edge 51 forming a retaining and drainage channel or gutter for rain or snow that may enter through the joint between the abutting edges of the sections. As shown in Figs. 5a and 7, the internal flange 50 at the mid-joint of the roof, between the movable sections 27, 28, is formed by a channel like one of the roof carlines 42, having one of its flanges attached to the internal surface of the plating of the inner section 27, and its other flange engaged inside the plating of the outer section 28, or in close proximity thereto. The left-hand end of the inner roof section 27 has an internal flange formed by a Z-bar 53 attached to the inner surface of the roof plating, with its outer flange 54 projecting outward to abut against a corresponding flange 54 of an angle attached to the left-hand stationary roof section 30. Abutting flanges 54, 54 are also shown on the outer sides of the roof plating at the joints between the movable sections 27, 28, and between the section 28 and the right-hand stationary roof section 30. Thus the joints are weatherproofed by the flanges 54, while the abutting roof sections are left free for relative movement. As shown in Figs. 1, 2, 5a, 6, and 7, Z-bars 55 are mounted on the inner roof section 27 at either side of its runway 32, with their upper flanges overlying the runway planks to protect them against damage by any possible contact with the outer roof section 28 when the sections are telescoped.

As shown in Figs. 1, 2, 6a, 13, 14, and 15, the roller or wheel 37 near the mid-end of the outer roof section 28 is pivoted on an axle pin 60 in the fork of a lever arm 61 whose upper end is pivoted at 62 to a housing 63 which is mounted on the lower margin of the roof section 28. The roller arm 61 has a socket 64 in its lower end, for receiving a lever rod 66 by means of which the arm 61 can be swung downward and to the right from its upper position in Figs. 1 and 13 to its lower position in Figs. 2, 6a, 14, and 15, where it supports the roof section 28 with its midend raised, as shown in Figs. 2 and 6a. As shown in Figs. 13, 14, 15, and 16, the lifting roller arm 61 also has a headed projection or stud 67 for engaging in the notch of a latch 68 (Fig. 17) pivoted to the housing 63 at 69, to hold the arm and the roller in its lifting position of Figs. 2 and 14. As shown in Fig. 17, the latch 68 has near its free end a rearward-projecting pin 70, which ordinarily rests on a cam-shoulder 71 on the arm 61 and holds the latch with its curved outer corner 72 behind the stud 67 on the arm; but when the arm 61 and roller 37 are swung counterclockwise by means of the lever-rod 66, the stud 67 engages the latch corner 72 and underrides the latch till it reaches the latch-notch, whereupon the latch 68 automatically drops around the stud 67. When the latch 68 is to be lifted and released from the projection 67, the arm 61 is first manually swung counterclockwise just enough to release the pressure between stud 67 and the edge of the latch-notch, whereupon the latch 68 may be manually lifted by its finger projection 73. Thereupon the arm 61 and the roller 37 automatically swing clockwise and upward, to the position shown in Figs. 1 and 13, while the mid-end of the roof section 28 descends until it rests directly on the trackway 34, as shown in Fig. 11. As the arm 61 swings clockwise, the latch end 72 rests on stud 67 of arm 61, until this stud moves out of the way and allows projection 70 to rest and ride on the shoulder 71 during the further movement of the arm. As shown in Figs. 1, 2, 6a, 13, 14, and 15, the structure of the housing 63 includes the lifting eye 38 for engagement by a sling or lifting hook when the roof section 28 is to be lifted by means of a crane, rather than by force manually exerted by means of the lever 66. During the lifting and descent of the abutting mid-end of the roof section 28, said section pivots about the axis of its right-hand roller 37, Figs. 1 and 2. It will be seen from Fig. 14 that the latch 68 cooperates with the stud 67 to limit the lifting counterclockwise swing of the arms 61 to positions short of dead-center with respect to their pivots 62.

To prevent banging of the roof sections 27, 28 when they are shifted in either direction, friction means are preferably provided. For the opening movement of the outer roof section 28, there is a friction pad 75 attached to the car body for engaging a rubbing surface on the roof section 28, Figs. 1, 2, 18 and 20. This pad 75 may preferably be mounted on the outer edge of the outer trackway flange 34, near its left-hand end in Figs. 1 and 2, and the rubbing surface of the roof section 28 may consist of the lower surface of its bottom flange 42a, Figs. 2, 11, and 12. As the roof section 28 approaches the end of its movement to the left, its bottom rubbing surface at 42a engages the slightly sloping top surface of the rubbing pad 75, as indicated by the full line and the first dot-and-dash line positions of the section 28 and its roller 37 in Fig. 20. As the roof section 28 continues its movement to the left, its left-hand roller 37 encounters and rolls up an upward slope or ramp on the upper surface of the trackway 34, shown in Figs. 19 and 20 as consisting of a sheet of metal 76 tapered in thickness and fixed to the trackway, thus lifting the friction surface 42a off the pad 75 at the very end of its closing movement. For gradually arresting the closing movement of the outer roof section 28, the lower flange 42a of this roof section has at its right-hand end a rubbing surface or pad 77 which encounters and rubs against an elevated rubbing surface or pad 78 attached to the upper surface of the trackway 34 near its outer edge, as shown in Figs. 21 and 22, lifting the right-hand roller 37 off the trackway 34. During the concluding movement of the roof section 28 to the right, the roller 37 at its right-hand end over-travels the rubbing surface or pad 78, thus using up momentum of the section 28, so that the remaining momentum of this section 28 will carry it to closed position without any appreciable bang.

For the opening and closing movements of the inside roof section 27, similar rubbing pads 80 on the bottom flange of the section 27 at either end coact with similar elevated rubbing surfaces of pads 78 on the outer trackway 34 adjacent the car side, as shown in Figs. 8, 18, 23, and 24. The action is similar to that for the closing movement of section 28, except that the rollers 36 never reach or overtravel any of the rubbing pads. As shown in Figs. 6 and 23, there is also a stop 81 on the trackway 33 for engaging the housing of the right-hand roller 36 of the roof section 27 and limiting its opening movement.

While the several friction means have all been described with reference to one side only of the car, it will be understood that in practice they will preferably be provided at both sides of the car.

Having thus described our invention, we claim:

1. In a railway car, the combination with a car body and a roof therefor comprising movable sections normally abutting endwise, but relatively shiftable vertically out of endwise-abutting relation, and when so shifted also relatively movable lengthwise of the car into telescoping relation, one over another, at either end of the car, of means for supporting one of said roof sections from the car body, after vertical shifting thereof, during relative movement of the sections into telescoping relation as aforesaid.

2. In a railway car, the combination with a car body and a roof therefor comprising movable sections normally abutting endwise, but relatively shiftable vertically out of endwise-abutting relation, and when so shifted also movable lengthwise of the car body into telescoping relation, one over another, at either end of the car, of means coacting with the car body and the roof sections for supporting the latter from the car body, after relative vertical shifting of the sections as aforesaid, during movement of the sections into telescoping relation at either end of the car.

3. In a railway car, the combination with a car body of a roof therefor comprising sections normally abutting endwise, but relatively shiftable vertically out of endwise-abutting relation, and when so shifted also relatively movable lengthwise of the car into telescoping relation, one over another, at either end of the car, and means coacting with a roof section and with the car body for shifting a roof section vertically, as aforesaid, while still supported from the car body.

4. The combination with a car body of outer and inner longitudinal trackways along its sides, outer and inner roof sections supported on said trackways for movement along them, but normally abutting endwise in the same horizontal plane, and means for lifting the outer roof section while still supported by its trackways, to allow relative movement of the sections one over the other.

5. The combination with a car body of outer and inner longitudinal trackways along its sides, outer and inner roof sections supported on said trackways for movement along them, but normally abutting endwise in the same horizontal plane, and means interposed between the outer roof section and its trackways for lifting and supporting said outer roof section, to allow relative movement of the sections one over the other, while both of the sections are supported by the trackways.

6. The combination with a car body of a roof therefor comprising sections movable lengthwise thereof and normally abutting endwise in the same horizontal plane, means for lifting one of said sections to allow it to overlie and move over the other, and means for lowering said other section to allow it to move under that first mentioned.

7. The combination with a car body of outer and inner longitudinal trackways along its sides, outer and inner roof sections on said trackways, normally abutting endwise in the same horizontal plane, said sections being provided with supporting rollers rolling on said trackways, and means coacting with supporting rollers of the outer roof section for lifting the same to allow the sections to shift lengthwise of the car relative to each other, one over the other.

8. The combination with a car body of outer and inner longitudinal trackways along its sides, both with a descent at one end of the car, outer and inner roof sections movable along said outer and inner trackways, and normally abutting endwise in the same horizontal plane, and means for lifting the end of the outer roof section abutting the inner one to allow either section to shift lengthwise of the car into telescoping relation with the other, over the corresponding end of the car.

9. The combination with a car body of outer and inner longitudinal trackways along its sides, outer and inner roof sections on said trackways, normally abutting endwise in the same horizontal plane, said sections being provided with supporting rollers rolling on said trackways, and supporting arms for rollers of the outer roof section pivoted thereto for swinging movement to lift and hold up said section, and thus allow the sections to shift lengthwise, one over the other, said supporting arms having sockets for operating lever bars for swinging the arms as aforesaid.

10. The combination with a car body of outer and inner longitudinal trackways along its sides, outer and inner roof sections on said trackways, normally abutting endwise in the same horizontal plane, said sections being provided with supporting rollers rolling on said trackways, supporting arms for rollers of the outer roof section pivoted thereto for swinging movement to lift said section to allow the sections to shift lengthwise, one over the other, means for limiting the lifting swing of said arms to a position short of dead center, and means for releasably securing said arms in roof-lifting positions.

11. The combination with a car body of a roof therefor comprising sections normally abutting endwise in the same horizontal plane, yet relatively shiftable lengthwise of the car into telescoping relation, one over the other, at either end of the car, means for lifting one of said roof sections to allow relative movement of the sections either way lengthwise of the car, one over the other, and means independent of said lifting means for fastening down the liftable section to the car body, against being lifted as aforesaid, thereby preventing such relative longitudinal movement of the sections either way.

12. The combination with a car body of outer and inner longitudinal trackways along its sides, outer and inner roof sections on said trackways, normally abutting endwise in the same horizontal plane, means for lifting the outer roof section while still supported on its trackways, to allow relative longitudinal movement of the sections one over the other, and fastening hook means for the liftable roof section pivoted thereto to swing inward under its trackway on the car body and thus hold it down to the latter against lifting as aforesaid and prevent relative movement of the sections as aforesaid, or to swing outward from under said trackway and allow said section to be lifted.

13. The combination with a car body of a roof therefor comprising sections normally abutting endwise in the same horizontal plane, yet relatively shiftable lengthwise of the car into telescoping relation, one over the other, and an internal flange in the end of one of said sections extending inward, lengthwise beyond said end, into the abutting end of the adjacent section, when the sections are in abutting relation as aforesaid, and outward toward the inside of the latter, thus coacting therewith in excluding the weather and forming a gutter for the run-off of water to either side of the car body while leaving the sections free of one another for relative longitudinal movement as aforesaid.

14. The combination with a car body of a roof therefor comprising fixed end sections projecting above the rest of the body and movable sections abutting endwise against one another and against said fixed ends when closed, but shiftable lengthwise of the car body into telescoping relation, the joint between abutting roof sections when closed comprising an internal flange at the end of one section extending lengthwise beyond said end into the end of the adjacent section and outward toward the inside of the latter, to coact therewith in excluding the weather, but leaving the sections free of one another for relative longitudinal movement as aforesaid.

15. The combination with a car body of outer and inner longitudinal trackways along its side walls, the latter higher than the former, and outer and inner roof sections on said trackways normally abutting endwise in the same horizontal plane, and extending down outside said trackways so as to shelter them and coact with them in excluding the weather, with means for shifting one of said sections vertically to allow relative longitudinal movement of the sections one over the other, while still supported by the trackways.

16. The combination with a car body of a roof therefor comprising fixed end sections projecting above the body, outer and inner trackways along its side walls, the latter higher than the former, outer and inner roof sections on said trackways extending down outside them, so as to shelter them and coact with them in excluding the weather, the joints between abutting roof sections comprising an internal flange at the end of one section extending lengthwise beyond said end into the end of the adjacent section and outward toward the inside of the latter, to coact therewith in excluding the weather, but leaving the sections free of one another for relative longitudinal movement.

17. The combination of a car body having a trackway along its side wall and a roof section movable lengthwise of the car body and having a downward-facing rubbing surface, of supporting rollers for said roof section traveling on said trackway, with an upward-facing rubbing surface on the car body engaging with said roof section rubbing surface as the roof section approaches the end of its movement and thereby lifting the weight of the roof section off the adjacent roller and checking the movement of said roof section.

18. The combination of a car body having a trackway along its side wall and a roof section movable lengthwise of the car body and having a downward-facing rubbing surface, of supporting rollers for said roof section traveling on said trackway, with an upward-facing elevated rubbing surface on said trackway engaging with said roof section rubbing surface as the roof section approaches the end of its movement and thereby lifting the weight of the roof section off the adjacent roller and checking the movement of said roof section, but over-traveled by the roller during the concluding movement of the roof section.

19. The combination of a car body having a trackway along its side wall and a roof section movable lengthwise of the car body and having a downward-facing rubbing surface, of supporting rollers for said roof section traveling on said trackway, with an upward-facing rubbing surface on the car body engaging with said roof section rubbing surface as the roof section approaches the end of its movement and thereby lifting the weight of the roof section off the adjacent roller and checking the movement of said roof section, and a ramp in said trackway ascended by said roller during the further movement of the roof section and serving to lift the said roof section rubbing surface out of contact with the said car body rubbing surface.

WENDEL J. MEYER.
THOMAS W. DEMAREST.